UNITED STATES PATENT OFFICE.

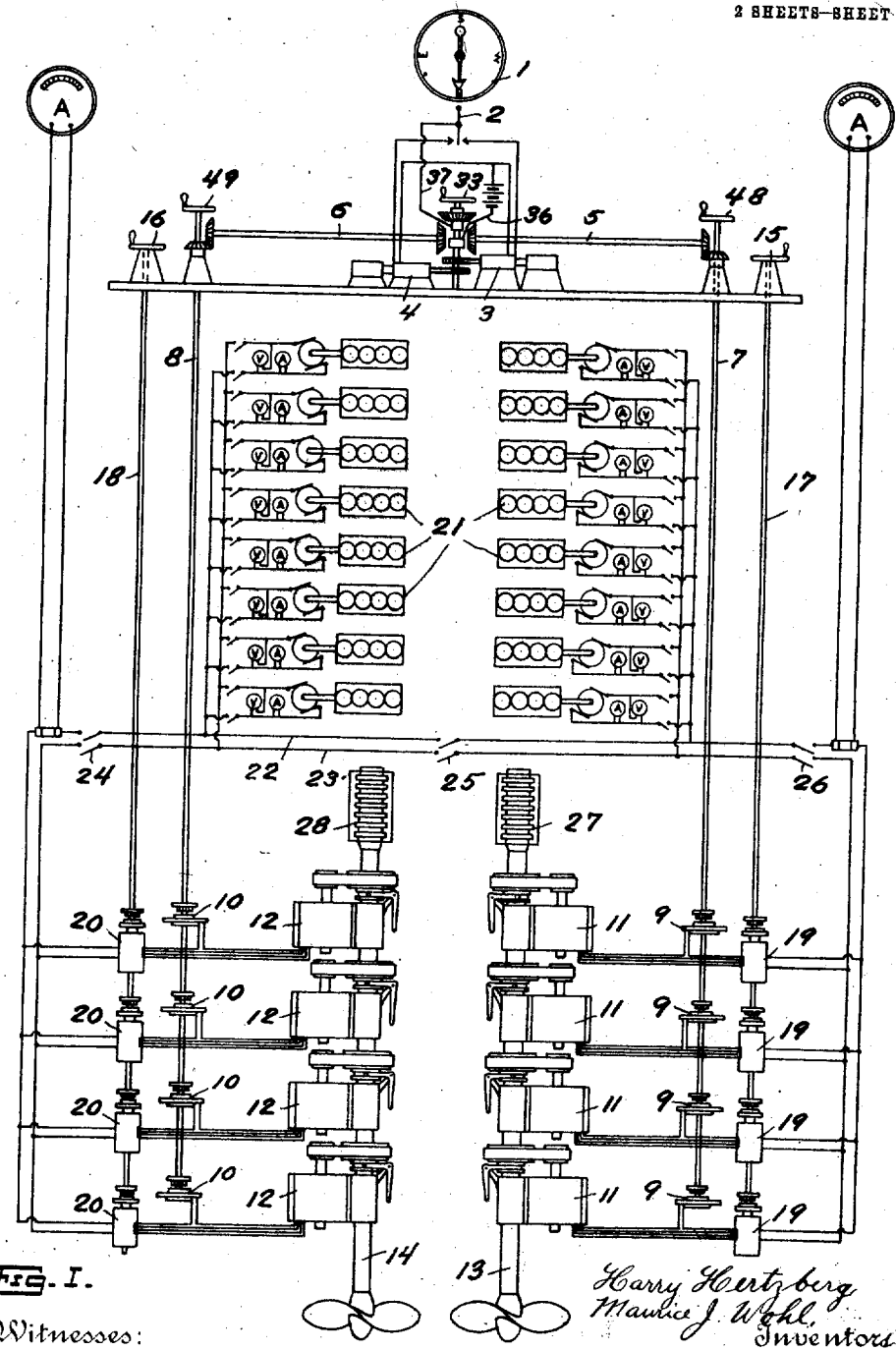

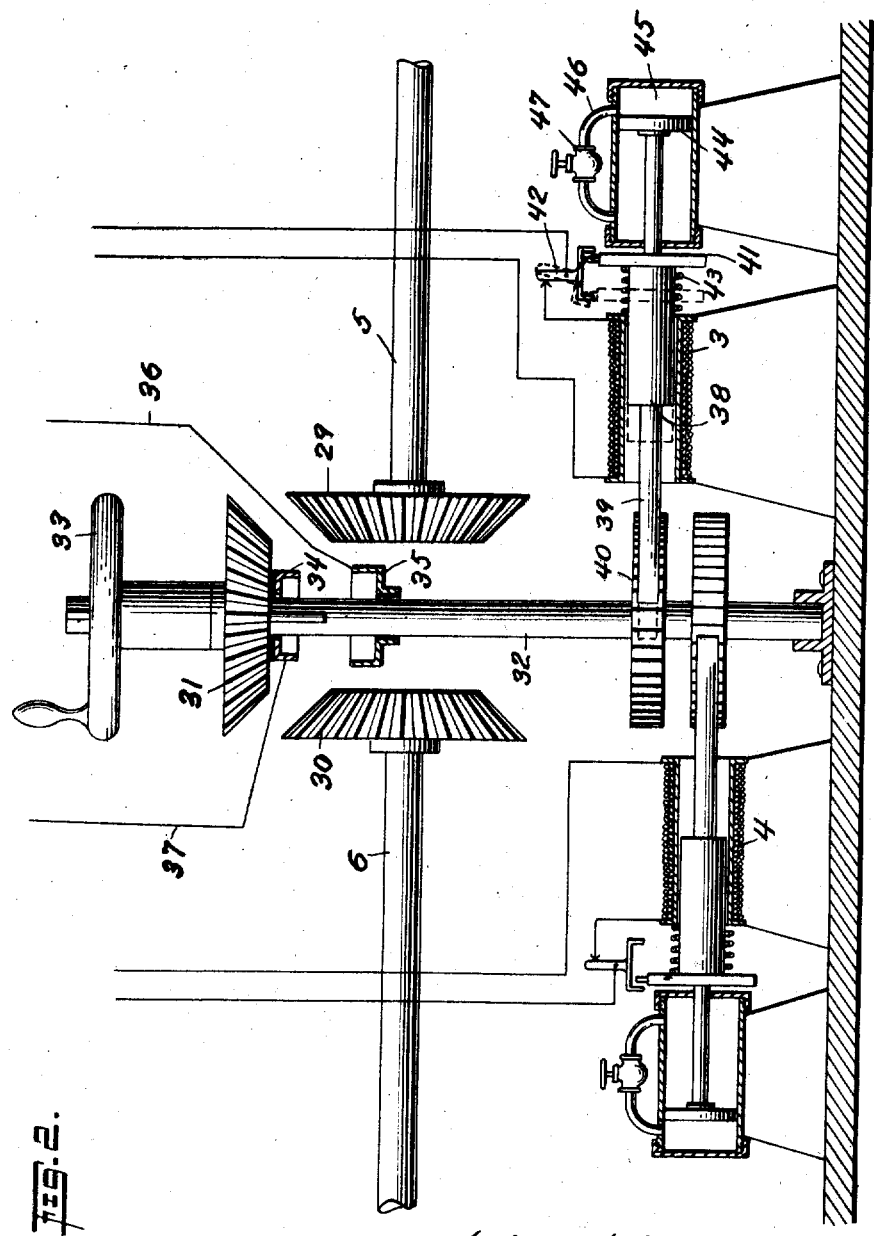

HARRY HERTZBERG AND MAURICE J. WOHL, OF NEW YORK, N. Y., ASSIGNORS TO MAURICE J. WOHL AND HARRY HERTZBERG, OF NEW YORK, N. Y., AND ABBOT A. LOW, OF HORSESHOE, NEW YORK, TRUSTEES.

STEERING MEANS FOR VESSELS.

980,156.  Specification of Letters Patent.  Patented Dec. 27, 1910.

Application filed December 12, 1908. Serial No. 467,234.

*To all whom it may concern:*

Be it known that we, HARRY HERTZBERG and MAURICE J. WOHL, citizens of the United States, and residents, respectively, of the city of New York, borough of Brooklyn, county of Kings, and State of New York, and of the city of New York, borough of Manhattan, county of New York, State of New York, have invented certain new and useful Improvements in Steering Means for Vessels, of which the following is a specification.

This invention relates to steering means for vessels or other vehicles and has for its object the provision of means for automatically steering and controlling the operation of the same by the compass.

In the embodiment of the invention herein shown and described a variable speed control is provided and the steering of the vessel is accomplished automatically without the use of a rudder.

The invention is shown as applied to a vessel having two propellers driven independently by a number of electric motors, the operating current for which is supplied by a number of direct connected generator sets driven by internal combustion engines of the kerosene type. This arrangement provides great economy in fuel space and possesses many other advantages which particularly adapt the same for use in this connection. The two sides or sets of generators, motors and propellers are independent and are so arranged that the separate units can be disconnected or connected together in different combinations, thus providing a flexible system.

In a system for controlling the steering of a vessel automatically, it is necessary to allow time for the vessel to take up its new course and to prevent the operation of the steering mechanism from turning the same too far upon its new course. This is accomplished in this invention by providing an intermittent control which is operated automatically and which will be described more fully hereinafter.

In the drawings accompanying this specification like parts in the several views have been given the same reference numbers.

Figure 1 is a plan view showing diagrammatically the arrangements of the various parts of the system. Fig. 2 is an enlarged plan view, partially in section, showing a portion of the steering mechanism.

In a co-pending application, filed by Harry Hertzberg, Aug. 14th, 1906, Ser. No. 330,613, the arrangement for a compass controlling device is fully explained. Such a device may be used in connection with this system, the compass being shown on the drawings at 1 and the circuit closer at 2. The circuit closer 2 is operated by the magnetic action of the compass needle and moved to one side or the other to close the circuit and operate either of the solenoids 3 or 4, as will be explained more fully hereinafter. These operating solenoids 3 and 4 operate the shafts 5 and 6 through a set of differential gears in opposite directions and these in turn rotate the shafts 7 and 8 in a like manner. A number of rheostats 9 and 10 are arranged to be operated from the shafts 7 and 8, respectively, and control the speed of the driving motors 11 and 12, respectively, which in turn drive the propeller shafts 13 and 14, respectively. Hand wheels 15 and 16 are provided to rotate the shafts 17 and 18, respectively, which in turn operate the starting and reversing motor controllers 19 and 20, respectively. Current for the driving motors is supplied by means of a number of direct connected generating sets, shown at 21, which supply current to the main busses 22 and 23 from which the current is supplied to the motors 11 and 12 through the several circuits, as shown in Fig. 1. Main switches are shown at 24, 25 and 26 by means of which the current from the generators 21 may be distributed entirely to one set or the other of the motors 11 and 12 or may be divided between the same. Current indicators or ammeters "A", indicate the current flowing on either side of the system. The driving motors 11 and 12 are arranged to be connected to the driving shafts 13 and 14, respectively, by independent clutches so that any one or more of the motors may be connected or disconnected from the same as may be desired. The field rheostats 9 and 10 and the controllers 19 and 20 are also connected to their respective operating shafts by means of the clutches so that these may also be connected or disconnected from the same as their respective motors are thrown into or out of commission. The propeller shafts 13 and 14 are provided with suitable thrust blocks and bearings 27 and 28, respectively.

Referring now to Fig. 2, the shafts 5 and 6 are provided with beveled gears 29 and 30, respectively, and are driven by the beveled gear 31 which is arranged to slide upon its shaft 32 into and out of engagement with the same. A hand wheel 33 is also slidably mounted upon the shaft 32 in connection with the gear 31 to provide for hand steering if desired. A pair of contacts 34 and 35 are mounted upon the gear 31 and shaft 32, respectively, and arranged to close the circuit when the gears 29, 30 and 31 are in mesh through the leads 36 and 37. A switch may be provided in the circuit 36—37 if desired for opening the same when the steering is to be done by hand.

The operation of the device for automatically steering is as follows: The compass 1 is set for the required direction and the operating motors 11 and 12 are connected to the propeller shafts 13 and 14 by means of their respective clutches. By means of these clutches any one of these motors may be connected or disconnected for providing more or less power as may be desired. The motors are started by means of the hand wheels 15 and 16 operating the controllers 19 and 20, respectively. The gear 31 is slid into engagement with the gears 29 and 30 and the operating circuit through the lines 36 and 37 is closed through the contacts 34 and 35 as described. Assuming now that the vessel changes its course slightly, the compass will throw the circuit closer 2 to one side or the other. Assuming the same is thrown to the right the circuit will be closed through the right hand solenoid 3 and the solenoid core 38 will be moved to the left, moving the ratchet arm 39 into engagement with the ratchet wheel 40, which is mounted upon the shaft 32, causing the same to be rotated until the solenoid core 38 reaches the position shown in dotted outline on the right in Fig. 2 when the flange 41, which is carried by solenoid 38, engages the switch 42, throwing the same to the position shown in dotted outline and disconnecting the circuit through the solenoid 3. A compression spring 43 now operates to throw the solenoid core 38 back to its initial position and, if the circuit closer 2 is still in its closed position, the same operation will be repeated. Should the vessel in the meantime, however, have resumed its course the circuit closer 2 will have opened the circuit and the solenoid 3 will not operate the second time. It is desirable to have the ratchet arm 39 arranged so as to be out of engagement with the ratchet wheel 40 when the solenoid is in its inoperative position and likewise the ratchet arm of the solenoid 4 out of engagement with its ratchet wheel in order to permit the shaft 32 to be rotated freely by the hand wheel 33 when the steering is done by hand.

At one end of the solenoid core a piston 44 is provided and arranged to be reciprocated in a chamber 45. A connecting pipe 46 is provided between the two ends of the chamber 45 from the opposite sides of the piston 44 and a valve 47 controls the escape of the fluid from one side to the other of the said piston as the same is reciprocated. By this means the length of time required for one operation of the solenoid as just described may be regulated and an intermittent control of the steering is provided. The operation of the solenoid 4 at the left is the same as that just described for the solenoid 3, it being understood that the ratchet wheels are arranged to rotate the shaft 32 in opposite directions. It now remains to describe the manner in which the steering is effected by the operation of these solenoids just described. It will be seen that the rotation of the shaft 32 and the gear 31 causes the shafts 5 and 6 to rotate in opposite directions. This is communicated by means of the shafts 7 and 8 to the field controllers 9 and 10, respectively, which in turn control the field current and, consequently, the speed of the driving motors 11 and 12 and as the speed of one is increased the speed of the other will be decreased, thus changing the course of the vessel by varying the speed of the propellers. By means of the controllers operated from the hand wheels 15 and 16 either or both of the sets of driving motors may be reversed if desired and thus the change of direction of the vessel accomplished much more quickly. Hand wheels 48 and 49 are provided for the shafts 7 and 8, respectively, and by throwing the gear 31 out of mesh the speed of the two sets of driving motors may be varied independently.

It will thus be seen that a very flexible system of control is provided not only for the steering but also for the propelling of the vessel and that the two sides may be entirely independent or operated together at will.

The intermittent control of the automatic operation of the steering may be adjusted to a great degree of nicety, whereby the course of the vessel may be altered as slowly as may be desired and sufficient time provided between these successive operations for the direction of the vessel to be changed. The advantage of this feature of the invention will be obvious, for were the increased speed of one of the propellers continued until the proper direction was reached the inertia of the vessel would carry the same beyond this point and it would become necessary to reverse the operation in order to bring the same back to the course.

As many changes could be made in the above construction and many apparently widely different embodiments of our invention designed without departing from the scope thereof, we intend that all matter contained in the above description or shown in the accompanying drawings shall be interpreted as illustrative merely of an operative embodiment of our invention and not in a limiting sense.

What we claim is:

1. A vehicle provided with a plurality of propellers, independent driving means for said propellers, a compass, and means operated by said compass for controlling said driving means.

2. A vehicle having a plurality of propellers, separate means for driving said propellers in unison, and means for automatically and momentarily varying the relative speed of said driving means.

3. A vehicle having a plurality of propellers each of which is provided with a plurality of independent driving units, a plurality of independent means for cutting out one or more of said driving units, and means for automatically varying the operation of said driving units whereby said propellers may be driven at different speeds.

4. A vessel having a plurality of propellers, operating motors for said propellers, mechanism arranged to be operated intermittently to control said motors, and means for varying the periodicity of said intermittent operation.

5. A vessel having a plurality of propellers, operating motors for said propellers, mechanism arranged to be automatically operated intermittently to control said motors, and means for varying the periodicity of said intermittent operation.

6. In combination with a vehicle, a pair of propellers, motors for driving said propellers, field rheostats for controlling the speed of said motors, electrically operated means for operating said rheostats, and a compass adapted to control the operation of said last named means.

7. In combination with a vehicle, a pair of propellers, motors for driving said propellers, field rheostats for controlling the speed of said motors, electrically operated ratchet devices for operating said rheostats, and a compass adapted to control the operation of said ratchet devices.

8. In combination with a vehicle, a pair of propellers, motors for driving said propellers, field rheostats for controlling the speed of said motors, ratchet devices adapted to be automatically operated intermittently to operate said rheostats, a compass, and electrically operated means controlled automatically by said compass for operating said ratchet devices.

Signed at Brooklyn, N. Y. city, in the county of Kings and State of New York, this 3d day of December, 1908.

HARRY HERTZBERG.
MAURICE J. WOHL.

Witnesses:
LEWIS W. HASKINS,
GEO. WELLING GIDDINGS.